United States Patent
Ruiz Flores et al.

(10) Patent No.: US 7,939,954 B2
(45) Date of Patent: May 10, 2011

(54) SYSTEM FOR CONTROLLING AND PROTECTING AGAINST SYMMETRICAL AND ASYMMETRICAL FAULTS FOR ASYNCHRONOUS-TYPE GENERATORS

(75) Inventors: Josu Ruiz Flores, Vizcaya (ES); Eneko Olea Oregui, Vizcaya (ES); Iker Garmendia Olarreaga, Vizcaya (ES); Nagore Azcarate-Ascasu Blazquez, Vizcaya (ES); Josu Elorriaga Llanos, Vizcaya (ES)

(73) Assignee: Ingeteam Technology, S.A., Zamudio Vizcaya (ES)

(*) Notice: Subject to any disclaimer, the term of this patent is extended or adjusted under 35 U.S.C. 154(b) by 312 days.

(21) Appl. No.: 12/085,194

(22) PCT Filed: May 17, 2006

(86) PCT No.: PCT/ES2006/000254
§ 371 (c)(1),
(2), (4) Date: May 19, 2008

(87) PCT Pub. No.: WO2007/057480
PCT Pub. Date: May 24, 2007

(65) Prior Publication Data
US 2009/0273185 A1 Nov. 5, 2009

(30) Foreign Application Priority Data
Nov. 21, 2005 (ES) .................................. 200502844

(51) Int. Cl.
H02J 3/38 (2006.01)
(52) U.S. Cl. .......................................... 290/44; 322/20
(58) Field of Classification Search .................... 290/44; 322/20; 361/20
See application file for complete search history.

(56) References Cited

U.S. PATENT DOCUMENTS

| | | | |
|---|---|---|---|
| 4,812,729 A | 3/1989 | Ito et al. | |
| 7,102,247 B2 | 9/2006 | Feddersen | |
| 7,164,562 B2 * | 1/2007 | Virtanen | 361/20 |
| 7,423,412 B2 * | 9/2008 | Weng et al. | 322/20 |
| 7,425,771 B2 * | 9/2008 | Rivas et al. | 290/44 |
| 7,432,686 B2 * | 10/2008 | Erdman et al. | 322/44 |
| 7,462,947 B2 * | 12/2008 | Wobben | 290/44 |
| 7,471,011 B2 * | 12/2008 | Janssen | 290/55 |
| 7,518,256 B2 * | 4/2009 | Juanarena Saragueta et al. | 290/44 |
| 7,622,815 B2 * | 11/2009 | Rivas et al. | 290/44 |
| 7,709,972 B2 * | 5/2010 | Arinaga et al. | 290/55 |
| 2005/0116476 A1 | 6/2005 | Feddersen | |
| 2005/0237678 A1 | 10/2005 | Virtanen | |
| 2006/0238929 A1 * | 10/2006 | Nielsen | 361/20 |
| 2007/0177314 A1 * | 8/2007 | Weng et al. | 361/20 |

FOREIGN PATENT DOCUMENTS

| | | |
|---|---|---|
| EP | 1 499 009 | 1/2005 |
| JP | 7-67393 | 3/1995 |
| WO | 03/065567 | 8/2003 |
| WO | 2004/067958 | 8/2004 |
| WO | 2004/070936 | 8/2004 |
| WO | 2004/091085 | 10/2004 |
| WO | 2005/015730 | 2/2005 |

* cited by examiner

OTHER PUBLICATIONS

English abstract of WO 03/065567 dated Aug. 7, 2003.

Primary Examiner — Joseph Waks
(74) Attorney, Agent, or Firm — Ladas & Parry LLP

(57) ABSTRACT

A system for controlling and protecting double-fed asynchronous-type generators against symmetrical and asymmetrical faults, such that in the event of a symmetrical or asymmetrical fault, the system remains connected to the grid, absorbs the initial energy transient, and maintains control of the generators.

20 Claims, 8 Drawing Sheets

SYSTEM FOR CONTROLLING AND PROTECTING AGAINST SYMMETRICAL AND ASYMMETRICAL FAULTS FOR ASYNCHRONOUS-TYPE GENERATORS

OBJECT OF THE INVENTION

The present invention refers to a control and protection system, in the event of grid faults, for a doubly fed asynchronous generator of the type used in wind turbines that form part of a wind farm.

BACKGROUND TO THE INVENTION

Over the last few years, the number of wind turbines and wind farms connected to the electricity grid has increased considerably. For this reason, grid operators have set stricter demands for these machines, specifying a series of operating requirements to be met in the event of symmetrical and asymmetrical faults in order to avoid the disconnection of the asynchronous generators and grid destabilization.

It is important to observe that doubly fed machines exhibit different behaviour, depending on whether the fault is asymmetrical or symmetrical. During grid voltage dips, the converter over-current protection causes the converter to disconnect since it cannot control the current imposed at the rotor as a result of the short circuit at the stator. However, the said disconnection is not sufficient to protect the system given the fact that the current flows through the free diodes of the converter, causing the BUS voltage of intermediate circuit (3) to increase and putting the converter component parts at risk. Therefore, in order to protect the converter, the rotor is short-circuited and the generator is disconnected from the grid.

With regard to asymmetrical faults, the problem is aggravated as a result of the permanent appearance of current oscillations that make it impossible to regulate the generator power, as a result of the activation of the converter protective devices. It is necessary for control mechanisms to be introduced into the regulation system in order to continue to regulate generator (7) in the event of an asymmetrical fault. Without these mechanisms, which are the object of this invention, generator (7) is finally decoupled from the grid. These control mechanisms, which are the object of the invention, are described in section 7 (Systems control during asymmetrical and symmetrical faults).

Therefore, the control and regulation system must take the fault typology into account. At present, there are various solutions for dealing with the problem created by symmetrical faults, some of which are shown in documents WO 03/065567, WO 2004/067958, WO 2004/091085 and WO 2005/015730. However, there is no all-inclusive solution which, based on the requirements of the different codes and regulations, resolves the problems created by asymmetrical faults (two-phase or single phase).

DESCRIPTION OF THE INVENTION

Starting from this premise, the invention consists of a control system for doubly fed asynchronous generators which, on the one hand, allows the generator to remain connected to the grid by absorbing the initial transient and, on the other hand, makes it possible to maintain control of the wind turbine during faults, whether these be symmetrical or asymmetrical. In this way the requirements or specifications of the different grid connection codes and regulations are met, with regard to the supply of active and reactive power in fault situations and which are directed at facilitating the rapid restoration of the grid.

Specifically, the invention develops a control and protection system in the event of symmetrical and asymmetrical faults, for doubly fed asynchronous generators, whose stator is connected to the grid and comprising:
- a three-phase inverter
- an intermediate converter circuit formed by a DC BUS and which serves to couple the inverter with
- a three phase rectifier
- a crowbar to maintain control of the generator during the symmetrical and asymmetrical faults and to prevent its disconnection from the power grid.
- a central control unit (CCU) responsible for governing the system component parts;

which is characterised because:

a). there is a controller block connected to the crowbar, this block controls the absorption of the initial energy that appears when a fault occurs, this controller block comprises parallel branches made up of
 $a_1$) Resistor devices for short-circuiting the generator rotor,
 $a_2$) Electronic devices with a cut-out function to control the said resistor devices;

b) The control unit incorporates the means to capture, at least, the following electrical variables: grid voltage, rotor current, generator stator current, intermediate circuit voltage, crowbar voltage and that of the controller block variables, and the means to ensure that, should any of the said electrical variables go out of the pre-established operating limits, the resistor devices are activated, to ensure that the rotor voltage does not reach a value that would allow the rotor current to travel to the converter intermediate circuit.

It is also characterised because the control unit is equipped with some programmed control means comprising two power loops which in turn incorporate two current loops, with each power loop consisting of a power regulator PI, and each current loop consisting of a current regulator PI, with the said power regulators generating the current set-points (Sp-Irot-d, Sp-Irot-q) and the current regulators generating the voltage set-points (Sp-Vd, Sp-Vq) to be imposed on the generator rotor.

DESCRIPTION OF THE FIGURES

In order to better understand the object of this present invention, drawings are provided showing the preferred practical embodiment, susceptible to minor changes that do not undermine its fundamental principle.

Switchgear comprising the devices (contactors, sectionalizers, pre-load resistors, etc) required to activate and isolate the critical system components.

Figure 2:
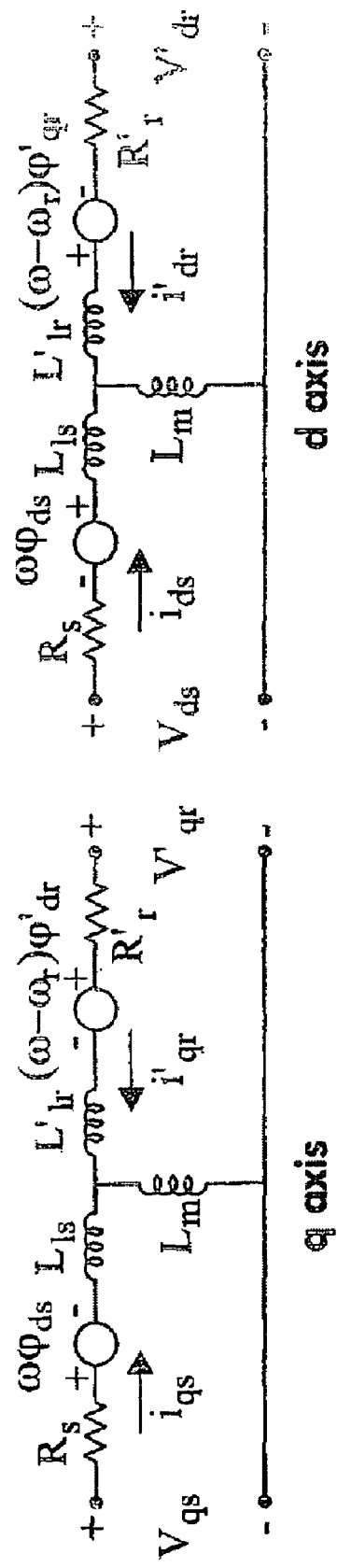

FIG. 2 shows the equivalent circuit for the asynchronous machine, referred to the stator in a two-axis reference system (D, Q).

Figure 3:
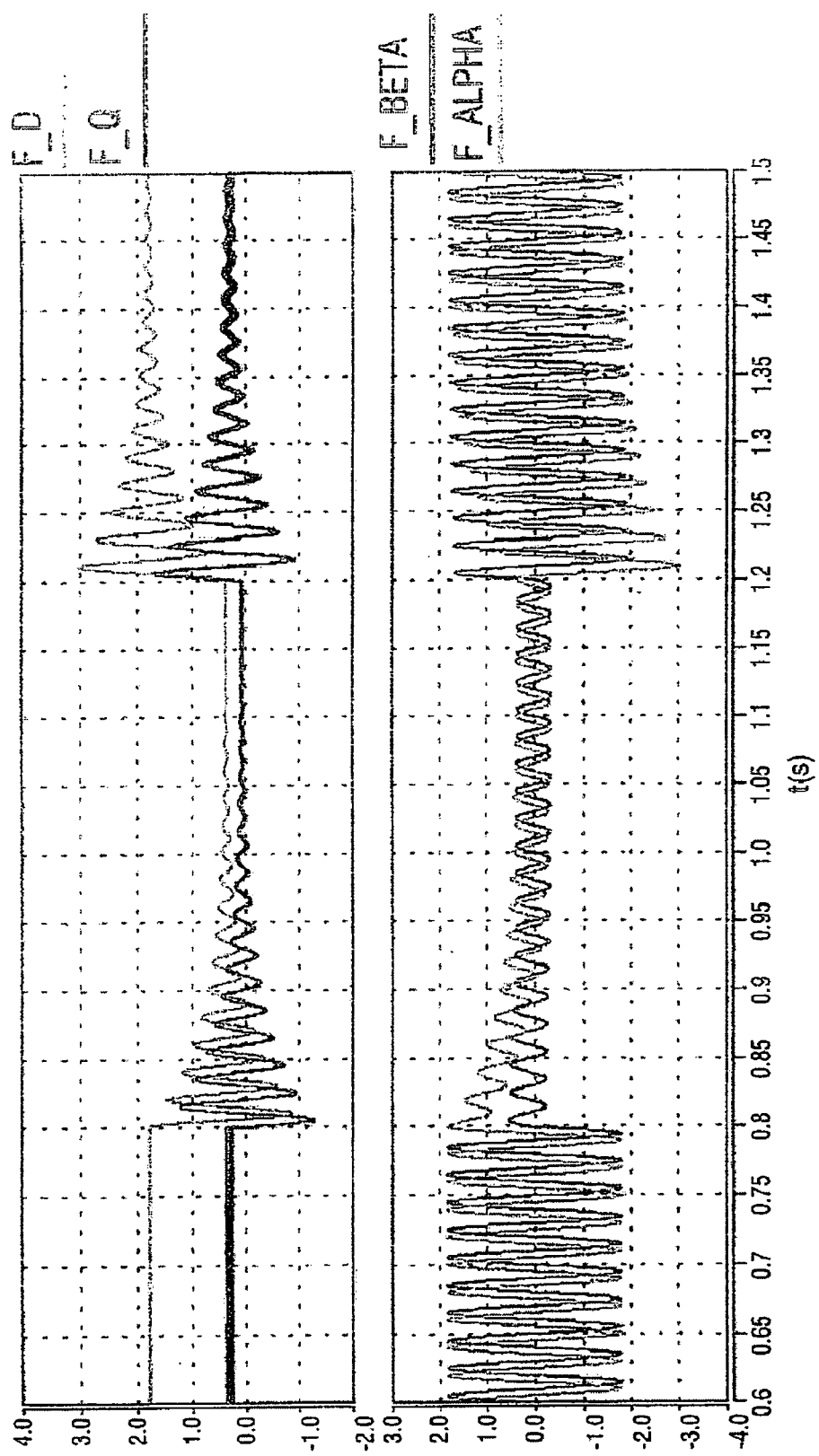

FIG. 3 shows the evolution of the machine flow during a three phase dip. It is shown in two reference systems (Axes Q, D and Axes ALPHA, BETA).

Figure 4:
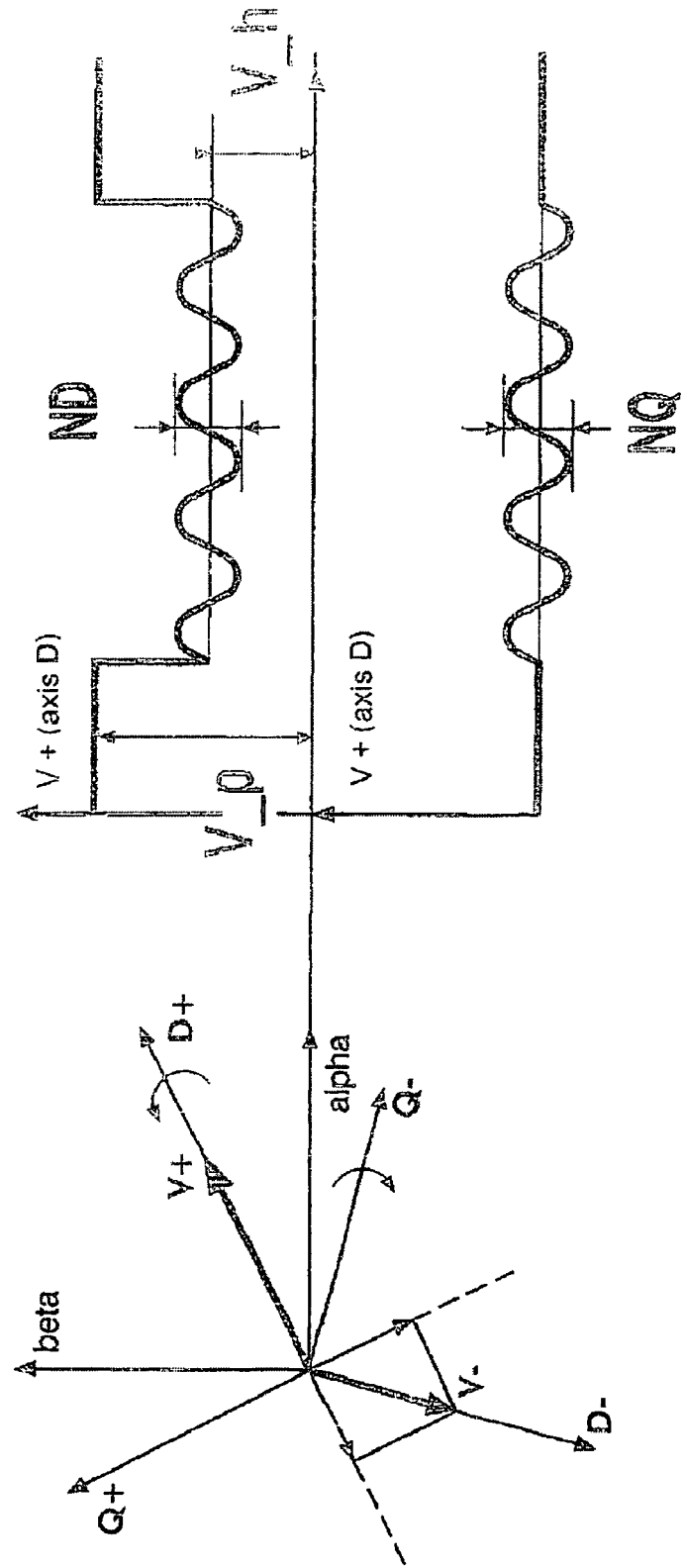

FIG. 4 shows the voltage vector in a fixed two-axis reference system (ALFA, BETA) and in a moving two-axis reference system (D, Q).

Figure 5:
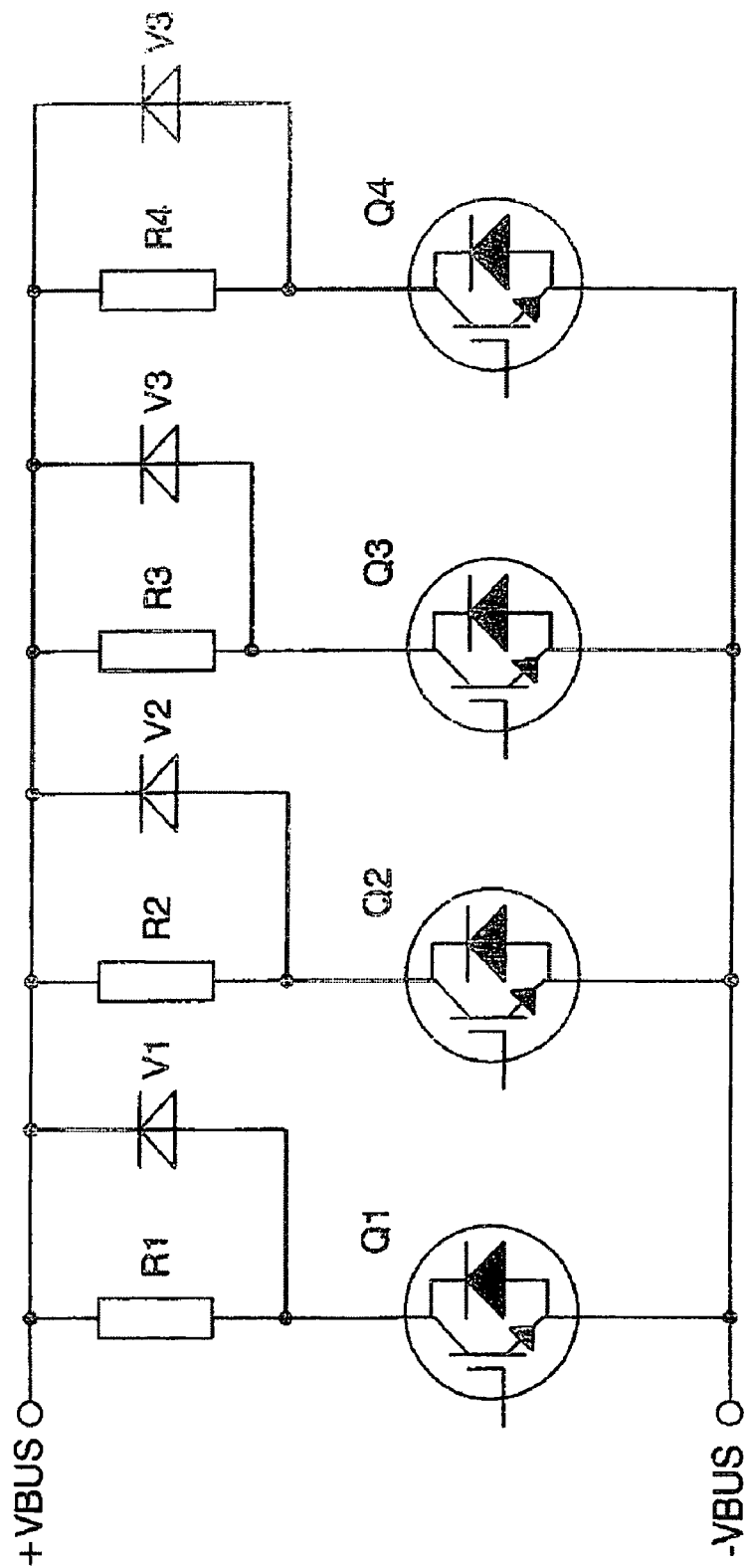
Figure 6:
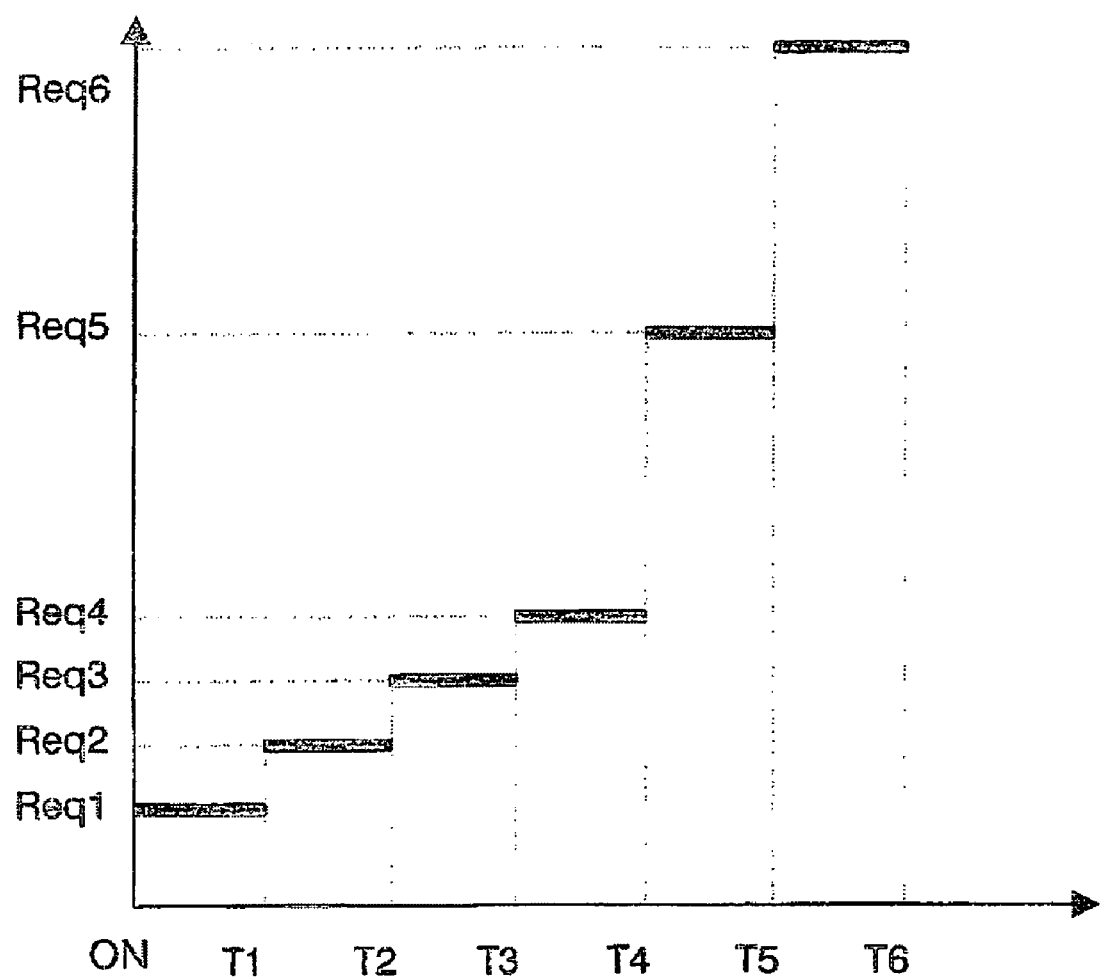

FIG. 5 depicts the hardware on which the absorption of the initial energy is made, according to FIG. 6. The said hardware is composed of four branches. Each branch is formed by a resistor and a semi-conductor which, in this case, is an IGBT.

FIG. 6 depicts the Crowbar activation states, setting the activation times for each resistor.

Figure 7:
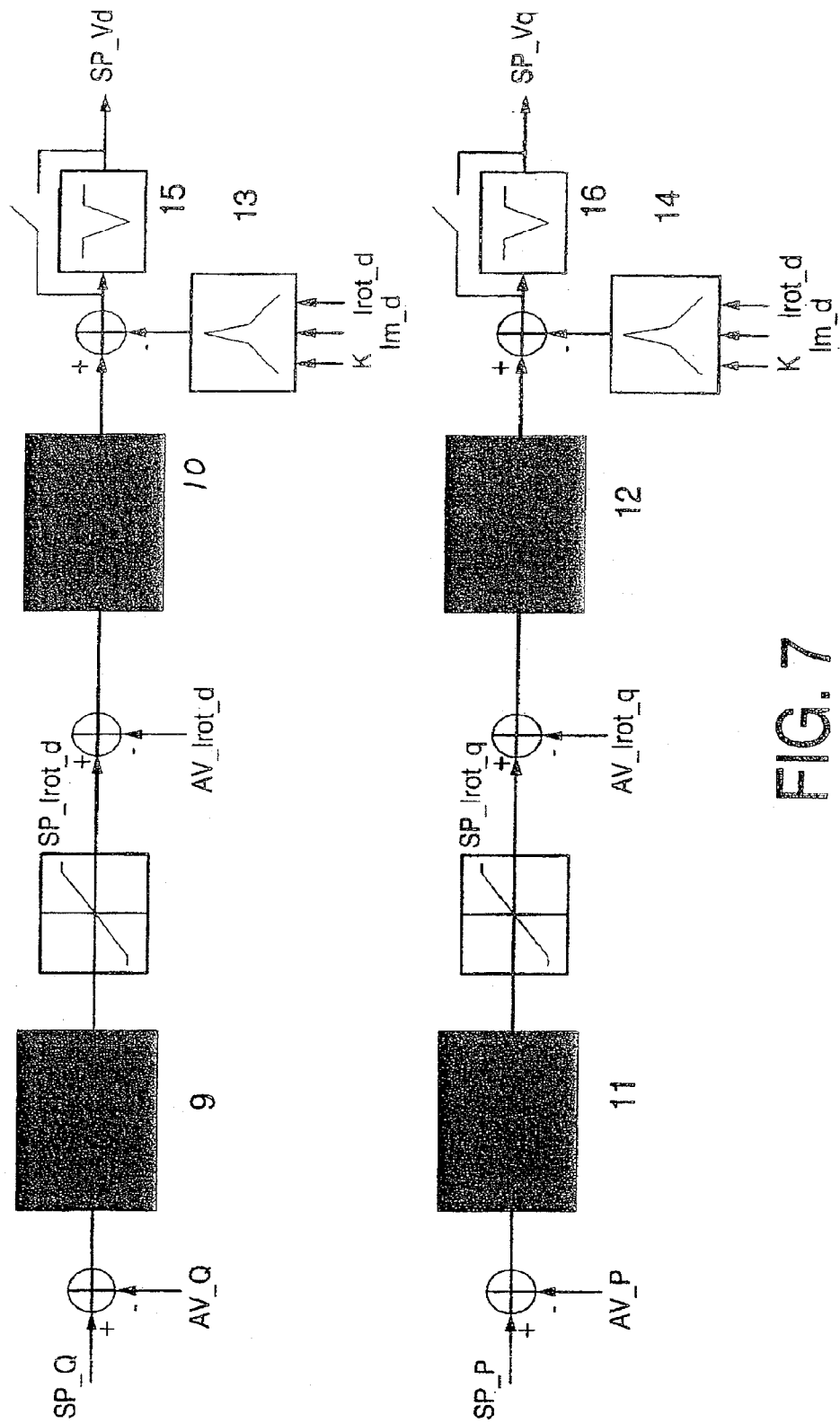

FIG. 7 depicts the regulation loops on axes d, q, of the control system. Each loop is formed by a current regulator PI and a power regulator PI. The regulator outputs are the output voltage set-points at axes d, q.

Figure 8:
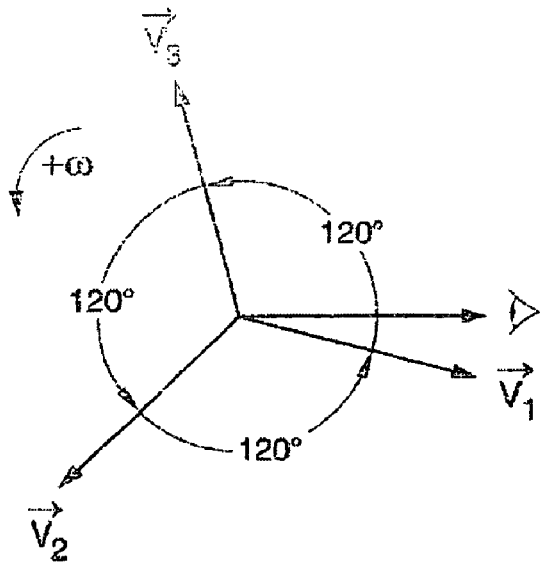

FIG. 8 shows a direct three phase system.

Figure 9:
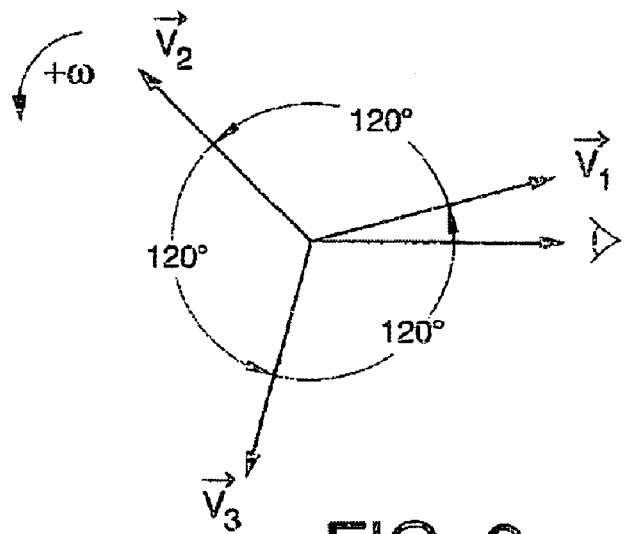

FIG. 9 shows an inverse three phase system.

Figure 10:
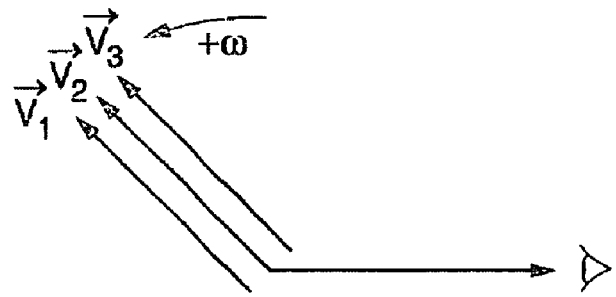

FIG. 10 shows a homopolar three phase system.

PREFERRED EMBODIMENT OF THE INVENTION

Described below is a non-restrictive example of the preferred embodiment of this present invention.

Given the fact that the concepts of direct system and inverse system will be used throughout the explanation, it should be explained that any three phase system can be represented by the sum of three, balanced three-phase systems: direct, inverse and homopolar.

Direct system (FIG. 8):
Vectors of the same amplitude
Vectors phase shifted by 120°
Arranged such that an observer standing still would see the vectors pass by in the following order: V1, V3, V2.

Inverse system (FIG. 9):
Vectors of the same amplitude
Vectors phase shifted by 120°
Arranged such that an observer standing still would see the vectors pass by in the following order: V1, V3, V2.

Homopolar system (FIG. 10).
Vectors of the same amplitude
In phase, so that an observer standing still would seem the vectors pass by at the same time.

An abrupt voltage variation at the stator of an asynchronous generator (7) connected to the grid, would result in the appearance of a transient in which the values for the stator current, rotor current and rotor voltage could suffer strong variations and which would depend on the severity and duration of the voltage dip and the electrical parameters of the machine and the grid to which it is connected.

Faced with a grid voltage dip, the magnetization branch of the asynchronous machine (7) will react to maintain the continuity of flow. The machine flow does not vary instantaneously, then there will be an abrupt voltage difference between the machine EMF (proportional to flow and speed) and the grid voltage, solely limited by the leak impedance, giving rise to an over-current at the stator.

The asynchronous machine equivalent circuit can be likened to the equivalent circuit of a transformer (FIG. 2), with the exception that, in the case of the asynchronous machine, the secondary winding (rotor) is a dynamic part that rotates and where the signal frequency is a function of the speed of rotation. Due to the coupling existing between the stator and rotor in an asynchronous machine, the currents established on one side will influence the form of the current on the other side.

The effect observed in the rotor currents will differ, depending on whether the fault is symmetrical or asymmetrical. For symmetrical faults, the machine magnetization is reduced to a certain level by the grid voltage level, whose transient will depend on the machine electrical parameters. During this transient, a continuous component appears in the stator currents, caused by the machine demagnetization. The 50 Hz frequency from the grid itself is superimposed on this component. On the rotor side, this transient appears on the rotor currents but with an oscillation corresponding to the machine frequency of rotation. The initial amplitude of these oscillations will depend on the depth of the dip and will finally be dampened after a certain time. FIG. 3 shows the evolution of the machine flow in the case of a three phase dip. 2 reference systems are shown (Axes Q, D and Axes ALPHA, BETA). Axes Q, D and ALPHA, BETA are the axes to which all the variables are referenced, as shown in FIG. 4.

There is no asymmetry in the symmetric voltage dips and therefore the three phase system, even when disturbed by a reduction in amplitude, continues to be balanced. In this way, the inverse sequence (FIG. 9) and homopolar sequence (FIG. 10) and the system shall solely consist of the positive sequence (FIG. 8).

On the other hand, with regard to the asymmetric faults, the disturbed three phase system presents an asymmetry, which means that, in addition to the positive sequence there is a negative sequence and, depending on the fault type and on the system connections (neutral and earth), also a homopolar sequence. FIG. 4 depicts the positive sequence by a vector rotating anti-clockwise at speed ws (V+). The negative sequence is represented by another vector rotating at the same speed but in the opposite direction (clockwise) (V−). In this way, an observer located on the reference system rotating with the positive vector (V+) will see the negative vector (V−) rotate at a speed of 2*ws. The amplitude of the negative sequence vector shall be projected onto the axes of the positive reference system (D+, Q+), causing the projection on axes D+ and Q+ (FIG. 4) of the positive vector (v+) to present an oscillation at frequency 2*ws which would be added to the base amplitude. The reasoning is similar for an observer situated over the negative reference system (D−, Q−).

Therefore the effect is different for each fault type.

On the other hand, in the event of a grid voltage dip, and regardless of the dip typology, an initial transient is generated, leading to the demagnetization of generator (7). Once the rotor currents have reached a value below the maximum current of converter (2) (moment in which the machine magnetization is defined by the grid voltage level), the generator power control is regained.

Therefore, the process is divided into two states:
The absorption of the initial energy transient (State 1)
The control of the system with asymmetric or symmetric faults (State 2).

The Absorption of the Initial Energy Transient.

A first state in which it is necessary to dampen the rotor currents, to ensure that this energy does not flow in the direction of the Converter (1, 2). For this, the rotor is short-circuited through resistors (R1, R2, R3, R4 of FIG. 5) which allow the transient generated to be controlled. The control of the said resistors, defined by FIG. 6, must be such that there can never be over-voltages at the rotor, which would put the converter (1, 2) at risk due to the uncontrolled currents that could be established between the Crowbar (6) and the DC bus (3).

The system represented in FIG. 5 comprises 4 branches of resistors (R1, R2, R3, R4) which are individually controlled. The resistors should be controlled in such a way that the rotor voltage does not exceed a value that would allow the circulation of current from the rotor to the converter intermediate circuit.

The system comprises a diode rectifier (5) connected to the generator rotor. The rectified voltage is termed Crowbar voltage. The Crowbar voltage is the voltage seen in the 4 branches formed by resistors (R1, R2, R3, R4) and switches Q1, Q2, Q3 and Q4. R1, R2, R3 and R4 are the resistors used to make the control during the initial transient. The power rating for the said resistors depends on the operating cycles they need to withstand and on the generator associated with the Crowbar. V1, V2, V3 and V4 are diodes in parallel to the resistors, serving as protective devices against over voltages.

The system in FIG. 5 has some passive protective devices, parallel to the resistor branches. These devices can be Varistors which are activated when the Crowbar voltage goes above a certain value.

It also has some measuring devices for the Crowbar voltage and Crowbar Current, in order to control (FIG. 6) the different states of each of the resistor combinations.

The control of the different switches (Q1, Q2, Q3, Q4) of each branch is made from the central control unit (8) which governs frequency converter (1, 2), which receives the necessary control signals. Likewise, the control of the said switches can also be made through a control system that is independent of the system governing the frequency converter formed by inverter (2) and rectifier (1). The said system would receive the measurement signals necessary to control each of the switches.

In the event of a grid fault, the following magnitudes are monitored and controlled: Grid voltages, Rotor current, Stator current, BUS voltage, Crowbar voltage and the variables required to control the four branches (FIG. 5). Should any of the said variables be out of the normal operating limits, then the resistor branches are activated, according to FIG. 6.

Times T1, T2, T3, T4, T5, T6 (FIG. 6) are variables times that depend on the evolution of the values for the Crowbar voltage, stator current, rotor current or BUS voltage.

Times T1, T2, T3, T4, T5, T6 (FIG. 6) can also be fixed value times, each one being different or the same.

Likewise, the different states formed by each of the equivalent resistors (REQ1, REQ2, REQ3, REQ4, REQ5, REQ6) can be varying in number and value, depending on the control strategy to be used.

The control strategy of resistors (R1, R2, R3, R4) permits that, after the deactivation of the last resistor, the rotor voltage should be such that there is no current circulation towards the BUS intermediate circuit. The exit condition for the last state must be met, for asymmetrical faults and also for symmetrical faults.

During the activation of the different branches of resistors (FIG. 5), the three phase inverter (2) stops switching and the IGBTs forming part of the said converter, are therefore not triggered. Rectifier (1) or grid-side converter, continues to operate, ensuring the control of the BUS voltage for asymmetrical faults and symmetrical faults.

Control of the System During Asymmetrical and Symmetrical Faults

Figure 1:
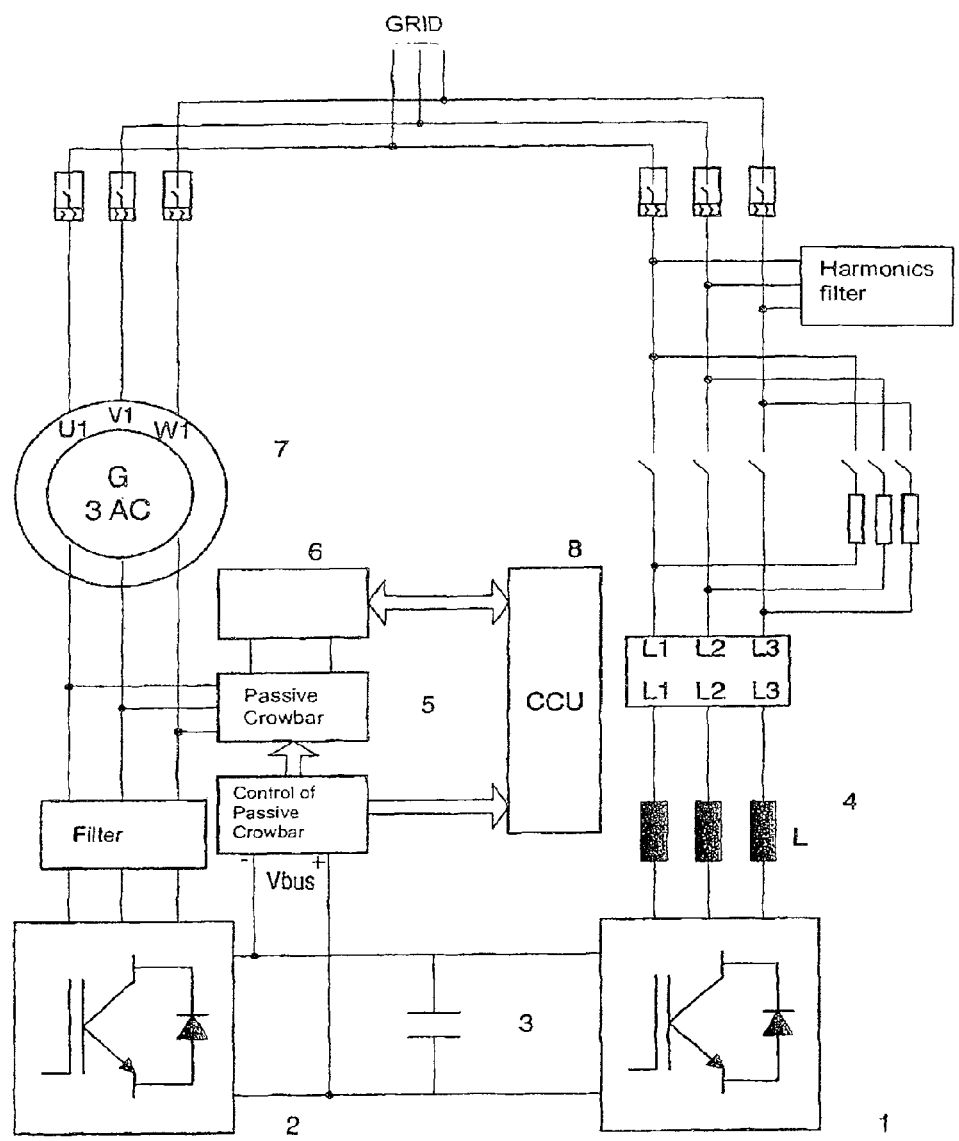
FIG. 1 shows the unit formed by the generator, converter and switchgear. The different component parts are as follows:
 Three phase inverter composed of 6 switches (normally IGBTs)
 Intermediate Converter circuit formed by a DC BUS and which serves to couple the rectifier and the inverter.
 Three phase rectifier composed of 6 switches responsible for maintaining the intermediate circuit voltage at a certain value.
 Central Control Unit (CCU), responsible for governing the above mentioned items and the item that is the object of the invention.
 SMART Crowbar, as part of an all-inclusive control and regulation system in order to be able to maintain control of the generator during asymmetrical faults.
 Doubly fed asynchronous generator, the stator of which is connected to the grid and the rotor is controlled by the three phase inverter.

As has been explained above, in the event of a symmetrical or asymmetrical voltage dip, two superposing effects occur and which are shown as oscillations in the generator rotor currents. The control mechanisms defined by FIG. 7 are explained below, these mechanisms are implemented by the CCU (8), for the correct control of the system defined by FIG. 1.

1. Damping of the Residual Oscillation of the Transient after Taking Control.

An initial effect is the oscillation occurring in machine (7) as a result of the short-circuit; this oscillation corresponds to the frequency of rotation of the generator. In order to suppress the said transient in the least possible time and thereby comply with current regulatory requirements, the flow oscillations (FIG. 3) must be dampened by means of damping mechanisms included in the control model (FIG. 7).

The said dampening mechanisms are justified below:

The equations for the asynchronous machine, once developed on two axes, can be summed up as $$Vrd = k(Ird) + K1*Lms*\frac{d\text{Im}sd}{dt} - \\ (Ws - W)(K1^2 L' fr*Irq + K1*Lms*\text{Im}sq) \quad (1)$$

$$Vrq = k(Irq) + K1*Lms*\frac{d\text{Im}sq}{dt} + \\ (Ws - W)(K1^2 L' fr*Irq + K1*Lms*\text{Im}sq) \quad (2)$$

Where K1 is the transformation ratio between the stator and rotor and K represents a term that is proportional to the rotor current.

It can be observed that the system will depend, on the one hand, on the rotor currents and, on the other hand, on the magnetization current with an oscillation that is a function of the generator speed. Therefore, the control system must take into account the said oscillations, in order to be able to keep the system under control.

The control system for generator (7), as shown in FIG. 7, comprises two power loops which, in turn, incorporate two current loops. Each loop is formed by regulator PI, such that there are four PI regulators: two power PI (P, Q) (9 and 11) and two current P1 (Id, Iq) (10 and 12). The power regulators generate the current setpoints (Sp_Irot_d, Sp_Irot_q) at axes 'd' and 'q' (FIG. 4), and the current regulators generate the voltage setpoints (Sp_Vd, Sp_Vq) to be imposed on the generator rotor at axes 'd' and 'q' (FIG. 4).

Therefore, in order to dampen the said flow oscillations (FIG. 3), summed to the counter-phase, at each current regulator output, is a term that is proportional to that indicated in equations (1) (2) in their second terms and which only contemplates the oscillations that appear in the magnetisation current (Points 13 and 14 of FIG. 7).

In this way, it is possible to retake control of the machine at the maximum current levels of converter (2) and reduce, on the other hand, the activation time of state 1, which has been explained above.

2. Treatment of the Oscillation Due to the Fault Asymmetry.

A second effect occurring in the system electrical variables is the oscillation as a result of the asymmetry of the actual fault itself. The effect, already explained above, generates a frequency oscillation 2*Fs (Amplitude NQ and ND of FIG. 4) which needs to be taken into account from the point of view of the machine regulation. If the band width available is not high enough, then the said frequency should not be regulated. The control system would then ignore the said frequency and let it circulate.

For this, the following is necessary: an initial step is the detection of the fault asymmetry. For this, based on the voltage readings for each phase, the following calculation is made:

$$1 - \frac{Vr}{Vs} < \text{Factor or } 1 - \frac{Vr}{Vt} < \text{Factor or } 1 - \frac{Vs}{Vt} < \text{Factor}$$

If any of these conditions should occur, then the fault is considered to be asymmetrical. The FACTOR variable is an adjustable variable, on the basis of which the fault is considered to be asymmetrical. The asymmetry calculation must be made during state 1, so that when the inverter retakes control of the generator, the said calculation has already been made.

Once the said calculation has been made, current loops (10, 12) should not take the said frequencies into account, for this purpose a filter tuned to 2*Fs (15, 16) should be applied at the current regulators output. The said filter must be applied when the fault produced is asymmetric.

The invention described provides an all-inclusive solution that makes it possible to protect and maintain control of the asynchronous generator in the event of symmetrical faults and, in particular, in the event of asymmetrical faults (two phase or single phase).

LIST OF TERMS

Vrd=Rotor voltage of the machine referred to the 'd' axis.
k (Ird)=Constant dependent on the rotor current referred to the 'd' axis
K1=Proportional constant
Lms=Magnetising inductance $\frac{d \text{Ims}d}{dt}$ = Derivative of the magnetization current derivative referred to axis 'd' with respect to time.

Ws=Synchronous angular electrical velocity
W=Machine electrical velocity
fr=Rotor frequency
Irq=Rotor current referred to the 'q' axis.
Imsq=Magnetisation current referred to the 'q' axis.
Vrq=Rotor voltage of the machine referred to the 'q' axis.
k(Irq)=Constant dependent on the rotor current referred to the 'q' axis.

$\frac{d \text{Ims}q}{dt}$ = Derivative of the magnetization current referred to the 'q' axis with respect to time SP_Q=Reactive Power setpoint
AV_Q=Actual value of the Reactive Power
SP_Irot_d=Setpoint for the rotor current referred to the 'd' axis.
AV_Irot_d=Actual value of the rotor current referred to the 'd' axis.
Im_d=Magnetization current referred to the 'd' axis.
Irot_d=Rotor current referred to the 'd' axis.
SP_Vd=Voltage setpoint referred to the 'd' axis.
SP_Vq=Voltage setpoint referred to the 'q' axis.
SP_P=Active power setpoint
AV_P=Actual value of the active power
AV_Irot_q=Actual value of the rotor current referred to the 'q' axis.
SP_Irot_q=Rotor current setpoint referred to the 'q' axis.

The invention claimed is:

1. A control and protection system in the event of symmetrical and asymmetrical faults, for a doubly fed asynchronous generator having a stator connected to a power grid, the system comprising:
   a three-phase inverter;
   an intermediate converter circuit formed by a DC BUS and which serves to couple the inverter with;
   a three phase rectifier;
   a crowbar;
   a controller block for maintaining control of the generator during symmetrical and asymmetrical faults and for preventing the generator from being disconnected from the power grid; and
   a central control unit including programmed control means comprising two power loops which in turn include two current loops, each of the power loops including a power regulator, and each of the current loops including a current regulator;
   wherein the programmed control means generates voltage setpoints to be imposed on a rotor of the generator to dampen current oscillations caused by the faults, the voltage setpoints being based on outputs of the current regulators and a proportional inverse magnetization current.

2. A control and protection system according to claim 1, wherein the central control unit includes detecting means for detecting an asymmetrical fault, the detecting means comprising a filter tuned to twice the stator frequency applied at the output of the current regulators.

3. A control and protection system according to claim 2, wherein the central control unit calculates $$1 - \frac{Vr}{Vs} < \text{Factor or } 1 - \frac{Vr}{Vt} < \text{Factor or } 1 - \frac{Vs}{Vt} < \text{Factor}$$

when the controller block absorbs an initial energy of the fault and decides that the fault is asymmetrical when any of these conditions occur.

4. A control and protection system according to claim 1, further comprising control means including a filter or a complex order system plus a gain, whose input can be the rotor current or the stator current or the flow current, and whose output is added or subtracted at the current regulators output, for the purpose of minimizing the initial energy transient absorption time, through the controller block activation.

5. A control and protection system according to claim 4, wherein the gain is fixed, variable or dependent on the system electrical parameters.

6. A control and protection system according to claim 4 further comprising a control mechanism capable of minimizing the energy transient absorption time, so that control of the generator is retaken above the converter rated current.

7. A control and protection system according to claim 6, wherein the control mechanism is formed by a filter of the Low Pass, or High Pass, or Band Pass type or by a complex structure transfer function.

8. A control and protection system according to claim 1 wherein:
   a) the controller block is connected to the passive crowbar to control an absorption of the initial energy that appears when the faults occur, this controller block comprises parallel branches made up of
a1) resistor devices for short-circuiting the rotor of generator,
a2) electronic devices with a cut-out function to control the said resistor devices.

9. A control and protection system according to claim 1 wherein
the control unit comprises the means to capture, at least, the following electrical variables: grid voltage, rotor current, stator current of generator, voltage of intermediate circuit, voltage of passive crowbar and that of the variables of controller block, and the means to activate the resistor device when any of the said electrical variables go out of the pre-established operating limits, to ensure that the rotor voltage does not reach a value that would allow the rotor current to travel to the converter intermediate circuit.

10. A control and protection system according to claim 1, wherein the control means further generates current setpoints based on outputs of the power regulators to dampen the current oscillations caused by the faults.

11. A control and protection system in the event of symmetrical and asymmetrical faults, for a doubly fed asynchronous generator having a stator connected to the grid, the system comprising:
a three-phase inverter;
an intermediate converter circuit formed by a DC BUS and which serves to couple the inverter with;
a three phase rectifier;
a crowbar;
a central control unit (CCU) for governing the system component parts;
a controller block for maintaining control of the generator during the symmetrical and asymmetrical faults and for preventing the generator from being disconnected from the power grid;
an independent control unit for governing said controller block; wherein:
the central control unit includes programmed control means comprising two power loops which in turn incorporate two current loops, each power loop consisting of a power regulator, and each current loop consisting of a current regulator,
and wherein the program control means generates voltage setpoints to be imposed on a rotor of the generator to dampen current oscillations caused by the faults, the voltage setpoints being based on at outputs of the current regulators and a proportional inverse magnetization current.

12. A control and protection system according to claim 11, wherein the independent control unit has control means for detecting an asymmetrical fault, comprising a filter tuned to twice the stator frequency applied at the output of the current regulators.

13. A control and protection system according to claim 12, wherein the central control unit calculates $$1 - \frac{Vr}{Vs} < \text{Factor or } 1 - \frac{Vr}{Vt} < \text{Factor or } 1 - \frac{Vs}{Vt} < \text{Factor}$$

when the controller block absorbs an initial energy of the fault and decides that the fault is asymmetrical when any of these conditions occur.

14. A control and protection system according to claim 11, further comprising control means including a filter or a complex order system plus a gain, whose input can be the rotor current or the stator current or the flow current, and whose output is added or subtracted at the current regulators output, for the purpose of minimizing the initial energy transient absorption time, through the controller block activation.

15. A control and protection system according to claim 14, wherein the gain is fixed, variable or dependent on the system electrical parameters.

16. A control and protection system according to claim 14 further comprising a control mechanism capable of minimizing the energy transient absorption time, so that control of the generator is retaken above the converter rated current.

17. A control and protection system according to claim 16, wherein the control mechanism is formed by a filter of the Low Pass, or High Pass, or Band Pass type or by a complex structure transfer function.

18. A control and protection system according to claim 11 wherein:
a) the controller block is connected to the passive crowbar to control an absorption of the initial energy that appears when the faults occur, and comprises parallel branches made up of
a1) resistor devices for short-circuiting the rotor of generator, and
a2) electronic devices with a cut-out function to control the said resistor devices.

19. A control and protection system according to claim 11 wherein the independent control unit comprises means to capture, at least, the following electrical variables: grid voltage, rotor current, stator current of generator, voltage of intermediate circuit, voltage of passive crowbar and that of the variables of controller block, and the means to activate the resistor devices when any of the said electrical variables go out of the pre-established operating limits, to ensure that the rotor voltage does not reach a value that would allow the rotor current to travel to the converter intermediate circuit.

20. A control and protection system according to claim 11, wherein the control means further generates current setpoints based on outputs of the power regulators to dampen the current oscillations caused by the faults.

* * * * *